United States Patent
McElroy et al.

(10) Patent No.: US 7,883,803 B2
(45) Date of Patent: Feb. 8, 2011

(54) SOFC SYSTEM PRODUCING REDUCED ATMOSPHERIC CARBON DIOXIDE USING A MOLTEN CARBONATED CARBON DIOXIDE PUMP

(75) Inventors: James F. McElroy, Suffield, CT (US); Arne Watson Ballantine, Menlo Park, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 984 days.

(21) Appl. No.: 11/730,256

(22) Filed: Mar. 30, 2007

(65) Prior Publication Data

US 2008/0241638 A1 Oct. 2, 2008

(51) Int. Cl.
H01M 8/06 (2006.01)
H01M 8/10 (2006.01)
H01M 8/04 (2006.01)

(52) U.S. Cl. .................. 429/410; 429/411; 429/472; 429/479

(58) Field of Classification Search ............. 429/12–46, 429/400, 410–411, 415, 472, 479, 490
See application file for complete search history.

(56) References Cited

U.S. PATENT DOCUMENTS

| | | | |
|---|---|---|---|
| 3,488,266 A | 1/1970 | French | |
| 3,935,028 A | 1/1976 | Strasser et al. | |
| 4,041,210 A | 8/1977 | Van Dine | |
| 4,182,795 A | 1/1980 | Baker et al. | |
| 4,532,192 A | 7/1985 | Baker et al. | |
| 4,543,303 A | 9/1985 | Dantowitz et al. | |
| 4,792,502 A | 12/1988 | Trocciola et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,084,362 A | 1/1992 | Farooque | |
| 5,143,800 A | 9/1992 | George et al. | |
| 5,169,730 A | 12/1992 | Reichner et al. | |
| 5,170,124 A | 12/1992 | Blair et al. | |

(Continued)

FOREIGN PATENT DOCUMENTS

JP 2004-247290 A 9/2004

(Continued)

OTHER PUBLICATIONS

Machine translation of JP 2006-114373.*

(Continued)

*Primary Examiner*—Basia Ridley
*Assistant Examiner*—Jacob Buchanan
(74) *Attorney, Agent, or Firm*—The Marbury Law Group PLLC

(57) ABSTRACT

A solid oxide fuel cell power generation system's entire output is made up of three streams: water, sequestered carbon dioxide provided into a storage tank, and carbon dioxide depleted air. Thus, the system generates electricity from a hydrocarbon fuel, while outputting substantially no pollutants into the atmosphere and cleaning the air by removing carbon dioxide from the air exhaust stream. Thus, the system outputs cleaner air than it takes in without releasing pollutants into the atmosphere, while generating electricity from a readily available hydrocarbon fuel, such as natural gas.

15 Claims, 1 Drawing Sheet

U.S. PATENT DOCUMENTS

| | | | |
|---|---|---|---|
| 5,302,470 A | | 4/1994 | Okada et al. |
| 5,413,878 A | * | 5/1995 | Williams et al. ............... 429/16 |
| 5,441,821 A | | 8/1995 | Merritt et al. |
| 5,498,487 A | | 3/1996 | Ruka et al. |
| 5,501,914 A | | 3/1996 | Satake et al. |
| 5,505,824 A | | 4/1996 | McElroy |
| 5,518,828 A | * | 5/1996 | Senetar ....................... 429/439 |
| 5,527,631 A | | 6/1996 | Singh et al. |
| 5,541,014 A | * | 7/1996 | Micheli et al. ............... 429/415 |
| 5,573,867 A | | 11/1996 | Zafred et al. |
| 5,601,937 A | | 2/1997 | Isenberg |
| 5,686,196 A | | 11/1997 | Singh et al. |
| 5,733,675 A | | 3/1998 | Dederer et al. |
| 5,741,605 A | | 4/1998 | Gillett et al. |
| 5,955,039 A | | 9/1999 | Dowdy |
| 6,013,385 A | | 1/2000 | DuBose |
| 6,051,125 A | | 4/2000 | Pham et al. |
| 6,106,964 A | | 8/2000 | Voss et al. |
| 6,251,534 B1 | | 6/2001 | McElroy |
| 6,280,865 B1 | | 8/2001 | Eisman et al. |
| 6,329,090 B1 | | 12/2001 | McElroy et al. |
| 6,348,278 B1 | | 2/2002 | LaPierre et al. |
| 6,403,245 B1 | | 6/2002 | Hunt et al. |
| 6,436,562 B1 | | 8/2002 | DuBose |
| 6,451,466 B1 | | 9/2002 | Grasso et al. |
| 6,531,243 B2 | | 3/2003 | Thom |
| 6,569,298 B2 | | 5/2003 | Merida-Donis |
| 6,623,880 B1 | | 9/2003 | Geisbrecht et al. |
| 6,655,150 B1 | | 12/2003 | Asen et al. |
| 6,821,663 B2 | | 11/2004 | McElroy et al. |
| 6,854,688 B2 | | 2/2005 | McElroy et al. |
| 6,908,702 B2 | | 6/2005 | McElroy et al. |
| 6,924,053 B2 | | 8/2005 | McElroy |
| 7,045,238 B2 | | 5/2006 | Gottmann et al. |
| 2001/0010873 A1 | | 8/2001 | Thom |
| 2001/0049035 A1 | | 12/2001 | Haltiner et al. |
| 2002/0015867 A1 | | 2/2002 | Cargnelli et al. |
| 2002/0028362 A1 | | 3/2002 | Prediger et al. |
| 2002/0051898 A1 | | 5/2002 | Moulthrop et al. |
| 2002/0058175 A1 | | 5/2002 | Ruhl |
| 2002/0106544 A1 | | 8/2002 | Noetzel et al. |
| 2002/0142208 A1 | | 10/2002 | Keefer et al. |
| 2003/0157386 A1 | | 8/2003 | Gottmann et al. |
| 2003/0162067 A1 | | 8/2003 | McElroy |
| 2003/0180602 A1 | | 9/2003 | Finn et al. |
| 2003/0194368 A1 | * | 10/2003 | Devos et al. ............... 423/657 |
| 2003/0196893 A1 | | 10/2003 | McElroy et al. |
| 2003/0205641 A1 | | 11/2003 | McElroy et al. |
| 2004/0005492 A1 | | 1/2004 | Keefer et al. |
| 2004/0018144 A1 | | 1/2004 | Briscoe |
| 2004/0081859 A1 | | 4/2004 | McElroy et al. |
| 2004/0096713 A1 | | 5/2004 | Ballantine et al. |
| 2004/0115489 A1 | | 6/2004 | Goel |
| 2004/0142215 A1 | | 7/2004 | Barbir et al. |
| 2004/0161364 A1 | * | 8/2004 | Carlson ....................... 422/41 |
| 2004/0191597 A1 | | 9/2004 | McElroy |
| 2004/0191598 A1 | | 9/2004 | Gottmann et al. |
| 2004/0202914 A1 | | 10/2004 | Sridhar et al. |
| 2004/0224193 A1 | | 11/2004 | Mitlitsky et al. |
| 2005/0048334 A1 | | 3/2005 | Sridhar et al. |
| 2005/0164051 A1 | | 7/2005 | Venkataraman et al. |
| 2005/0197612 A1 | | 9/2005 | Levin et al. |
| 2005/0214609 A1 | | 9/2005 | McElroy |
| 2005/0271914 A1 | * | 12/2005 | Farooque et al. ............... 429/19 |
| 2006/0251934 A1 | | 11/2006 | Valensa et al. |
| 2007/0017367 A1 | | 1/2007 | McElroy et al. |
| 2007/0017368 A1 | | 1/2007 | LeVan et al. |
| 2007/0017369 A1 | | 1/2007 | LeVan et al. |
| 2007/0178338 A1 | | 8/2007 | McElroy et al. |

FOREIGN PATENT DOCUMENTS

| | | | |
|---|---|---|---|
| JP | 2006-114373 | * | 4/2006 |
| WO | WO-2004/013258 A1 | | 2/2004 |
| WO | WO-2004/093214 A2 | | 10/2004 |
| WO | WO 2005/072441 A2 | | 8/2005 |
| WO | WO 2005/112177 A2 | | 11/2005 |

OTHER PUBLICATIONS

Cheng et al., "A review of PEM hydrogen fuel cell contamination: Impacts, mechanisms, and mitigation". Journal of Power Sources, vol. 165, Issue 2, pp. 739-756. Mar. 20, 2007. Available online Jan. 8, 2007.*

McLean et al., "An assessment of alkaline fuel cell technology". International Journal of Hydrogen Energy, vol. 27, Issue 5, pp. 507-526. May 2002. Available online Dec. 18, 2001.*

"Low Cost, Compact Solid Oxide Fuel Cell Generator," NASA Small Business Innovation Research Program.

"Low Cost, High Efficiency Reversbile Fuel Cell (and Electrolyzer) Systems," Proceedings of the 2001 DOE Hydrogen Program Review NREL/CP-570-30535, 8 pgs.

"Small, Ultra Efficient Fuel Cell Systems," Advanced Technology Program ATP 2001 Competition (Jun. 2002), pp. 1-2.

"Type BPL Granular Carbon", Calgon Product Bulletin, Calgon Corporation, Activated Carbon Division, 2 pgs.

U.S. Appl. No. 60/924,874, filed Jun. 4, 2007, Ballantine et al.

U.S. Appl. No. 10/653,240, filed Sep. 3, 2003, Sridhar et al.

U.S. Appl. No. 11/124,120, filed May 9, 2005, Valensa et al.

U.S. Appl. No. 11/188,118, filed Jul. 25, 2005, Levan et al.

U.S. Appl. No. 11/188,120, filed Jul. 25, 2005, Levan et al.

U.S. Appl. No. 11/188,123, filed Jul. 25, 2007, McElroy et al.

U.S. Appl. No. 11/274,928, filed Nov. 16, 2005, Gottmann et al.

U.S. Appl. No. 11/276,717, filed Mar. 10, 2006, Hickey et al.

U.S. Appl. No. 11/491,487, filed Jul. 24, 2006, McElroy et al.

U.S. Appl. No. 11/491,488, filed Jul. 24, 2006, McElroy et al.

U.S. Appl. No. 11/730,255, filed Mar. 30, 2007, Ballantine et al.

Berlier, Karl et al., "Adsorption of CO2 on Microporous Materials. 1. On Activated Carbon and Silica Gel", J. Chem. Eng. Data, 1997, vol. 42, pp. 533-537.

C.E. Milliken et al., "Low Cost, High Efficiency Reversible Fuel Cell Systems," Proceedings of the 2002 U.S. DOE Hydrogen Program Review, NREL/CP-610-32405, pp. 1-14.

Cell and Stack Construction: Low-Temperature Cells, L.G. Austin, NASA SP-120, 1967.

EG & G, Parsons, Inc., SAIC. Fuel Cell Handbook. 5th Edition. USDOE. Oct. 2000. 9-1-9-4; 9-12-9-14.

F. Mitlitsky et al, Regenerative Fuel Cells for High Altitude Long Endurance Solar Powered Aircraft, 28th Intersociety Energy Conversion Engineering Conference (IECEC), Jul. 28, 1993, UCRL-JC-113485, pp. 1-8.

F. Mitlitsky et al, "Unitized Regenerative Fuel Cells for Solar Rechargeable Aircraft and Zero Emission Vehicles," 1994 Fuel Cell Seminar, Sep. 6, 1994, UCRL-JC-117130, pp. 1-7.

LeVan, M. Douglas et al., "Adsorption and Ion Exchange", Perry's Chemical Engineers' Handbook (7th Edition), 1997, 66 pgs.

LeVan, M. Douglas et al., "Fixed-Bed Adsorption of Gases: Effect of Velocity Variations on Transition Types", AIChE Journal, vol. 34, No. 6, Jun. 1988, pp. 996-1005.

M. P. King et al., "Concentration of Carbon Dioxide by a High-Temperature Electrochemical Membrane Cell," Journal of Applied Electrochemistry, vol. 15, No. 3 (1985), pp. 431-439.

Manchado, M. Cabrejas et al., "Adsorption of H2, O2, CO, and CO2 on a ?-Alumina: Volumetric and Calorimetric Studies", Langmuir, vol. 10, 1994, pp. 685-691.

Olivier, Marie-Georges et al., "Adsorption of Light Hyrdocarbons and Carbon Dioxide on Silica Gel", J. Chem. Eng. Data, 1997, vol. 42, pp. 230-233.

Qi, Nan et al., "Adsorption equilibrium modeling for water on activated carbons", Carbon, vol. 43, 2005, pp. 2258-2263.

R.C. Ruhl, "Low Cost Reversible Fuel Cell System," Proceedings of the 2000 U.S. DOE Hydrogen Program Review, Jun. 15, 2000, NREL/CP-570-28890, pp. 1-9.

Rudisill, Edgar N. et al., "Coadsorption of Hydrocarbons and Water on BPL Activated Carbon", Ind. Eng. Chem. Res., 1992, vol. 31, pp. 1122-1130.

S. Jensen et al., "High Temperature Electrolysis of Steam and Carbon Dioxide", Proceedings of Riso International Energy Conference, held at Riso National Laboratory, Denmark, May 19-21, 2003, Riso-R-1405(CN), pp. 204-215.

Shaffer, Steven, "Development Update on Delphi's Solid Oxide Fuel Cell System", 2004 SECA Review Meeting, 34 pgs., http://www.netl.doe.gov/publications/proceedings/04/seca-wrkshp/Delphi%20-%20Shaffer.pdf.

Sward, Brian K. et al., "Frequency Response Method for Measuring Mass Transfer Rates in Adsorbents via Pressure Perturbation", Adsorption, vol. 9, 2003, pp. 37-54.

Sward, Brian K. et al., "Simple Flow-Through Apparatus for Measurement of Mass Transfer Rates in Adsorbent Particles by Frequency Response", Fundementals of Adsorption, K. Kaneko et al., eds., vol. 7, 2002, pp 29-36. Published by IK International of Japan.

Walton, Krista S. et al., "A Novel Adsorption Cycle for CO2 Recovery: Experimental and Theoretical Investigations of a Temperature Swing Compression Process", Revised Manuscript, submitted in 1995 to Separation Science & Technology, 30 pgs.

Yang, Ralph T., "Adsorbents: Fundamentals and Applications", 2003, 4 pgs.

Yong, Zou et al., "Adsorption of carbon dioxide at high temperature—a review", Separation and Purification Technology, vol. 26, 2002, pp. 195-205.

Yong, Zou et al., "Adsorption of Carbon Dioxide on Basic Alumina at High Temperatures", J. Chem. Eng. Data, 2000, vol. 45, pp. 1093-1095.

Zizelman, James et al., "Solid Oxide Fuel Cell Auxiliary Power Unit—A Development Update", SAE2002, World Congress, Mar. 4-7, 2002, SAE Technical Paper Series 2002-01-0411, 10 pgs.

* cited by examiner

SOFC SYSTEM PRODUCING REDUCED ATMOSPHERIC CARBON DIOXIDE USING A MOLTEN CARBONATED CARBON DIOXIDE PUMP

BACKGROUND OF THE INVENTION

The present invention relates generally to the field of fuel cells and more particularly to fuel cell systems integrated with carbon dioxide removal components.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

An article by M. P. Kang and J. Winnick, entitled "Concentration of carbon dioxide by a high-temperature electrochemical membrane cell", Journal of Applied Electrochemistry, Vol. 15, No. 3 (1985) 431-439, which is incorporated herein by reference in its entirety, describes a molten carbonate fuel cell that is converted into a molten carbonate carbon dioxide concentrator for carbon dioxide removal. The authors report carbon dioxide removal efficiencies of 97% for carbon dioxide inlet concentrations of 0.25%.

SUMMARY

The embodiments of the invention provide a fuel cell system which scrubs carbon dioxide from the atmosphere. The fuel exhaust stream of a fuel cell stack is sent to a carbon dioxide pump, which uses the fuel exhaust stream to remove carbon dioxide from the atmospheric reaction air stream, which is then sent to an air inlet of the fuel cell stack. The carbon dioxide pump may be a molten carbonate carbon dioxide pump.

DETAILED DESCRIPTION OF THE PREFERRED EMBODIMENTS

Figure 1:
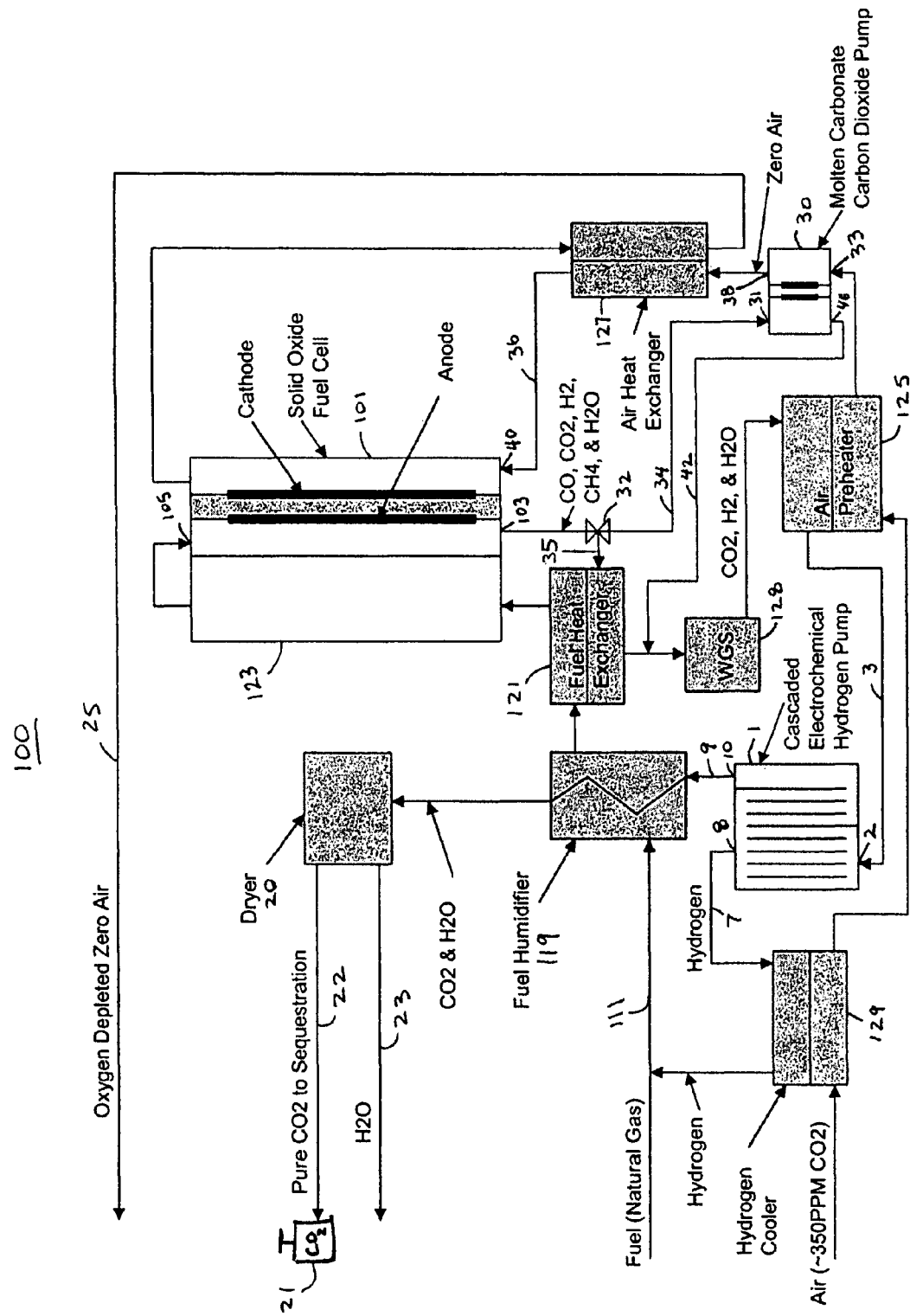
FIG. 1 is a schematic diagram of a fuel cell system of an embodiment of the invention.

In one embodiment of the invention, the entire output of a solid oxide fuel cell power generation system consists of three streams: water, sequestered carbon dioxide provided into a storage tank, and carbon dioxide depleted air. Thus, the system generates electricity from a hydrocarbon fuel, while outputting substantially no pollutants into the atmosphere and cleaning the atmosphere by removing carbon dioxide from the air exhaust stream. Thus, the system outputs cleaner air than it takes in without releasing pollutants into the atmosphere, while generating electricity from a readily available hydrocarbon fuel, such as natural gas. In contrast, many prior art fuel cell systems which operate on hydrocarbon fuels output various pollutants into the atmosphere. FIG. 1 illustrates how the molten carbonate carbon dioxide pump is used together with a fuel cell system, such as a solid oxide fuel cell system, to scrub carbon dioxide from the air, while generating electricity at the same time.

The fuel cell system 100 contains a fuel cell stack 101, such as a solid oxide fuel cell stack (illustrated schematically to show one solid oxide fuel cell of the stack containing a ceramic electrolyte, such as yttria or scandia stabilized zirconia, an anode electrode, such as a nickel-stabilized zirconia cermet, and a cathode electrode, such as lanthanum strontium manganite).

The system also contains a cascaded electrochemical hydrogen pump separation unit 1 which electrochemically separates hydrogen from the fuel exhaust stream. The unit 1 may comprise any suitable proton exchange membrane device comprising a polymer electrolyte. The hydrogen diffuses through the polymer electrolyte under an application of a potential difference between anode and cathode electrodes located on either side of the electrolyte. The anode, cathode, and polymer electrolyte together comprise a membrane cell. In a cascaded pump, several sets of cells are arranged in process fluid flow series so that the exhaust from one set of cells is used as an input for the next set of cells. In each set of at least two cells, at least two cells are arranged in parallel, such that the input stream is divided among the cells in the set. In other words, any one cell in one set is in process fluid flow series configuration with any one other cell in a different set, but all cells in each set are preferably in process fluid flow parallel configuration with respect to each other. The unit 1 may contain two or more sets of cells, such as three to five sets of cells. Each set of cells may contain one or more cells, such as one to twenty cells. Preferably, but not necessarily, each set contains more cells than the set(s) located downstream from it. For example, in a case of a unit 1 having three sets of cells arranged in series, the unit 1 separates hydrogen from the exhaust stream in a three step sequence. First, a quantity (X) of fuel exhaust is provided simultaneously to a first set of cells having for example four cells, and a first portion (A) of hydrogen is separated. Second, a remaining quantity (X−A) of fuel exhaust is provided to a second set of cells having for example two cells, and a second portion (B) of hydrogen is separated. Third, a remaining quantity (X−A−B) of fuel exhaust is provided to the third set of cells having one cell, and a third portion (C) of hydrogen is separated. The separated hydrogen (A+B+C) is provided into conduit 7 through output 8. The remaining portion of the fuel exhaust consisting essentially of carbon dioxide and water is provided into conduit 9 through output 10. The total quantity of separated hydrogen (A+B+C) is at least 95%, such as 95% to about 100% of the hydrogen contained in the quantity (X) of fuel exhaust provided to the electrochemical pump 1. The term "hydrogen" as used herein excludes hydrocarbon hydrogen atoms. For example, hydrogen includes molecular hydrogen ($H_2$). Preferably, the unit 1 comprises a stack of carbon monoxide tolerant electrochemical cells, such as a stack of high-temperature, low-hydration ion exchange membrane cells. This type of cell includes a non-fluorinated ion exchange ionomer membrane, such as, for example, a polybenzimidazole (PBI) membrane, located between anode and cathode electrodes. The membrane is doped with an acid, such as sulfuric or phosphoric acid. An example of such cell is disclosed in US published application US 2003/0196893, incorporated herein by reference in its entirety. These cells generally operate in a temperature range of above 100 to about 200 degrees Celsius. Thus, the heat exchangers in the system 100 preferably keep the fuel exhaust stream at a temperature of about 120 to about 200 degrees Celsius, such as about 160 to about 190 degrees Celsius. Other hydrogen separators may also be used. However, an additional carbon dioxide scrubber may be required to be used in conjunction with alternative hydrogen separators to remove any remaining carbon dioxide from the hydrogen stream.

The system 100 also contains the first conduit 3 which operatively connects a fuel exhaust outlet 103 of the fuel cell stack 101 to a first inlet 2 of the unit 1. The system also contains a second conduit 7 which operatively connects a first outlet 8 of the unit 1 to a fuel inlet 105 of the fuel cell stack 101. Preferably, the system 100 lacks a compressor which in operation compresses the fuel cell stack fuel exhaust stream to be provided into the unit 1. The system 100 also contains a third conduit 9 which operatively connects a second outlet 10 of the unit 1 to an exhaust waste containment unit 21, such as a carbon dioxide storage tank for sequestering exhaust waste, such as carbon dioxide and/or water. Preferably, the conduit 9 is also connected to a dryer 20 that separates the carbon dioxide from the water contained in the exhaust stream. The dryer 20 can use any suitable means for separating carbon dioxide from water, such as separation based on differences in melting point, boiling point, vapor pressure, density, polarity, or chemical reactivity. Preferably, the separated carbon dioxide is substantially free of water and has a relatively low dew point. Preferably, the separated carbon dioxide is sequestered in the containment unit 21 in order to minimize greenhouse gas pollution by the system 100.

The system 100 also contains a carbon dioxide pump 30 which removes carbon dioxide from the air inlet stream provided to the stack 101 and thus removes carbon dioxide from the atmosphere. The carbon dioxide pump 30 may include a molten carbonate fuel cell or fuel cell stack that is adapted to remove carbon dioxide from an atmospheric reaction air stream that is sent to the cathode side of the molten carbonate fuel cell or cells in the stack. The molten carbonate fuel cell may be operated as a molten carbonate carbon dioxide concentrator, as described in the article by M. P. Kang and J. Winnick, entitled "Concentration of carbon dioxide by a high-temperature electrochemical membrane cell", Journal of Applied Electrochemistry, Vol. 15, No. 3 (1985) 431-439, which is incorporated herein by reference in its entirety. The molten carbonate fuel cell includes a cathode, an anode, and an electrolyte. The electrolyte of the molten carbonate fuel cell may include a ceramic matrix that supports a salt mixture, such as a salt mixture of lithium carbonate and potassium carbonate, which in operation forms a conductive liquid. The carbon dioxide pump 30 may also include a carbon dioxide scrubber, such as sodium hydroxide-coated silica, soda lime, or other carbon dioxide absorbents.

The system 100 also contains a fourth conduit 34 which operatively connects the fuel exhaust outlet 103 of the stack 101 to a first inlet 31 of the carbon dioxide pump 30. Preferably, the system contains a flow control device 32, such as an orifice or a valve which in operation controls the amount of flow of the fuel exhaust stream through conduits 34 and 35. The device 32 allows at least a portion of the fuel exhaust stream, for example about 3-10%, such as about 5%, to flow into the carbon dioxide pump 30 via the conduit 34, while allowing the remainder of the exhaust stream, for example about 90-97%, such as about 95%, to flow into conduit 35. For example, when device 32 comprises an orifice, such an orifice is positioned in conduit 34 to narrow the diameter of this conduit 34 and to provide the majority of the fuel exhaust stream into wider conduit 35. The carbon dioxide pump 30 also includes an air inlet 33 through which the atmospheric reaction air stream enters the pump 30. Another conduit 36 operatively connects an air exhaust outlet 38 of the carbon dioxide pump 30 to an air inlet 40 of the SOFC stack 101. A conduit 42 operatively connects a fuel exhaust outlet 46 of the carbon dioxide pump 30 to the first inlet 2 of the unit 1. Preferably, conduit 42 provides the fuel exhaust stream from pump 30 into the water gas shift reactor 128. While a molten carbonate fuel cell or stack is preferred as a carbon dioxide pump, other carbon dioxide pump types may be used to scrub carbon dioxide from the air inlet stream.

The system 100 further preferably contains a fuel humidifier 119 having a first inlet operatively connected to a hydrocarbon fuel source, such as the hydrocarbon fuel inlet conduit 111, a second inlet operatively connected to the fuel exhaust outlet 103, a first outlet operatively connected to the fuel cell stack fuel inlet 105, and a second outlet operatively connected to the dryer 20. In operation, the fuel humidifier 119 humidifies a hydrocarbon fuel inlet stream from conduit 111 containing the recycled hydrogen using water vapor contained in a fuel cell stack fuel exhaust stream. The fuel humidifier may comprise a polymeric membrane humidifier, such as a perfluorosulfonic acid membrane humidifier (e.g., NAFION® membrane), an enthalpy wheel or a plurality of water adsorbent beds, as described for example in U.S. Pat. No. 6,106,964 and in U.S. application Ser. No. 10/368,425, which published as U.S. Published Application No. 2003/0162067, all of which are incorporated herein by reference in their entirety. NAFION®, a registered trademark of DuPont, is a sulfonated tetrafluoroethylene based fluoropolymer-copolymer. For example, one suitable type of humidifier comprises a water vapor and enthalpy transfer NAFION® based, water permeable membrane available from Perma Pure LLC. The humidifier passively transfers water vapor and enthalpy from the fuel exhaust stream into the fuel inlet stream to provide a 2 to 2.5 steam to carbon ratio in the fuel inlet stream. The fuel inlet stream temperature may be raised to about 80 to about 90 degrees Celsius in the humidifier.

The system 100 also contains a recuperative heat exchanger 121 which exchanges heat between a portion of the stack fuel exhaust stream provided through conduit 35 and the hydrocarbon fuel inlet stream being provided from the humidifier 119. The heat exchanger helps to raise the temperature of the fuel inlet stream and reduces the temperature of the fuel exhaust stream so that it may be further cooled downstream and such that it does not damage the humidifier.

If the fuel cells are external fuel reformation type cells, then the system 100 contains a fuel reformer 123. The reformer 123 reforms a hydrocarbon fuel containing inlet stream into hydrogen and carbon monoxide containing fuel stream which is then provided into the stack 101. The reformer 123 may be heated radiatively, convectively and/or conductively by the heat generated in the fuel cell stack 101 and/or by the heat generated in an optional burner/combustor, as described in U.S. patent application Ser. No. 11/002,681, filed Dec. 2, 2004, which published as U.S. Published Application No. 2005/0164051, incorporated herein by reference in its entirety. Alternatively, the external reformer 123 may be omitted if the stack 101 contains cells of the internal reforming type where reformation occurs primarily within the fuel cells of the stack.

Optionally, the system 100 also contains an air preheater heat exchanger 125. This heat exchanger 125 heats the air inlet stream being provided to the fuel cell stack 101 using the heat of the fuel cell stack fuel exhaust. Preferably, the exchanger 125 is located upstream of the carbon dioxide pump 30. If desired, this heat exchanger 125 may be omitted. If the preheater heat exchanger 125 is omitted, then the air inlet stream is provided directly into the air inlet 33 of the carbon dioxide pump 30 by a blower or other air intake device.

The system 100 also preferably contains an air heat exchanger 127. This heat exchanger 127 further heats the air inlet stream being provided to the fuel cell stack 101 using the heat of the fuel cell stack air (i.e., oxidizer or cathode)

exhaust. Preferably, the exchanger 127 is located downstream of the carbon dioxide pump 30. The system also optionally contains a hydrogen cooler heat exchanger 129 which cools the separated hydrogen stream provided from unit 1, using an air stream, such as an air inlet stream.

The system may also contain an optional water-gas shift reactor 128. The water-gas shift reactor 128 may be any suitable device which converts at least a portion of the water in the fuel exhaust stream into free hydrogen. For example, the reactor 128 may comprise a tube or conduit containing a catalyst which converts some or all of the carbon monoxide and water vapor in the fuel exhaust stream into carbon dioxide and hydrogen. Preferably, the reactor 128 lowers the concentration of the remaining methane and carbon monoxide in the fuel exhaust stream to trace levels, such as less than about 1,500 ppm. Thus, the reactor 128 increases the amount of hydrogen in the fuel exhaust stream. The catalyst may be any suitable catalyst, such as a iron oxide or a chromium promoted iron oxide catalyst. The reactor 128 may be located between the fuel heat exchanger 121 and the air preheater heat exchanger 125.

The system 100 operates as follows. A fuel inlet stream is provided into the fuel cell stack 101 through fuel inlet conduit 111. The fuel may comprise any suitable fuel, such as a hydrocarbon fuel, including but not limited to methane, natural gas which contains methane with hydrogen and other gases, propane, methanol, ethanol or other biogas, or a mixture of a carbon fuel, such as carbon monoxide, oxygenated carbon containing gas, such as ethanol, methanol, or other carbon containing gas with a hydrogen containing gas, such as water vapor, $H_2$ gas or their mixtures. For example, the mixture may comprise syngas derived from coal or natural gas reformation.

The fuel inlet stream passes through the humidifier 119 where humidity is added to the fuel inlet stream. The humidified fuel inlet stream then passes through the fuel heat exchanger 121 where the humidified fuel inlet stream is heated by a portion of the fuel cell stack fuel exhaust stream. The heated and humidified fuel inlet stream is then provided into a reformer 123, which is preferably an external reformer. For example, reformer 123 may comprise a reformer described in U.S. patent application Ser. No. 11/002,681, filed on Dec. 2, 2004, which published as U.S. Published Application No. 2005/0164051, incorporated herein by reference in its entirety. The fuel reformer 123 may be any suitable device which is capable of partially or wholly reforming a hydrocarbon fuel to form a carbon containing and free hydrogen containing fuel. For example, the fuel reformer 123 may be any suitable device which can reform a hydrocarbon gas into a gas mixture of free hydrogen and a carbon containing gas. For example, the fuel reformer 123 may comprise a nickel and rhodium catalyst coated passage where a humidified biogas, such as natural gas, is reformed via a steam-methane reformation reaction to form free hydrogen, carbon monoxide, carbon dioxide, water vapor and optionally a residual amount of unreformed biogas. The free hydrogen and carbon monoxide are then provided into the fuel (i.e., anode) inlet 105 of the fuel cell stack 101. Thus, with respect to the fuel inlet stream, the humidifier 119 is located upstream of the heat exchanger 121 which is located upstream of the reformer 123 which is located upstream of the stack 101.

The air or other oxygen containing gas (i.e., oxidizer) inlet stream is preferably provided into the stack 101 through a heat exchanger 127, where it is heated by the air (i.e., cathode) exhaust stream from the fuel cell stack. Prior to passing through the exchanger 127 and entering into the stack 101, the air inlet stream is depleted of carbon dioxide by the carbon dioxide pump 30. For instance, the air inlet stream is depleted of at least 90%, preferably at least 97%, of carbon dioxide contained in the ambient air. If desired, the air inlet stream may also pass through the hydrogen cooler heat exchanger 129 and/or through the air preheat heat exchanger 125 to further increase the temperature of the air before providing the air into the stack 101. Preferably, no fuel is combusted with air, and if heat is required during startup, then the requisite heat is provided by the electric heaters which are located adjacent to the stack 101 and/or the reformer 123.

Once the fuel and air are provided into the fuel cell stack 101, the stack 101 is operated to generate electricity and a hydrogen containing fuel exhaust stream. An electrical current is produced by transferring oxygen ions from the oxidizer (i.e., cathode) inlet stream through the ceramic electrolyte layer of the stack 101 to the fuel (i.e., anode) inlet stream according to the following reactions:

Cathode: $O_2 + 4e^- \rightarrow 2O^{2-}$

Anode: $H_2 + O^{2-} \rightarrow H_2O + 2e^-$ $CO + O^{2-} \rightarrow CO_2 + 2e^-$ About 25% of the input fuel exits the fuel exhaust outlet 103 of the stack. The fuel exhaust stream (i.e., the stack anode exhaust stream) is provided from the stack fuel exhaust outlet 103 to the orifice or valve 32 which splits the stack fuel exhaust stream into a first exhaust stream portion and a second exhaust stream portion. The first exhaust stream portion is provided into the cascaded electrochemical pump separation unit 1 through conduit 35, water gas shift reactor 128 and heat exchangers 121 and 125. The second SOFC stack exhaust stream portion is provided into the carbon dioxide pump 30 via conduit 34. If the device 32 comprises a valve, then the valve may be switched to provide the entire SOFC stack exhaust stream into conduit 35 to by pass the pump 30 in one position and to split the stream between conduits 34 and 35 in another position. If the device 32 comprises an orifice, then it restricts the amount of the stack fuel exhaust stream provided to pump 30 through conduit 34. Preferably a minor portion of the fuel exhaust stream, such as 3% to 10%, such as about 5% of the fuel exhaust stream is provided into the carbon dioxide pump 30 through conduit 34 and the balance is provided to conduit 35.

The SOFC stack fuel exhaust stream is provided into the first inlet 31 of the carbon dioxide pump 30 from conduit 34. If a molten carbonate fuel cell or stack is used as the pump 30, then the SOFC stack fuel exhaust stream is provided to the anode of the molten carbonate fuel cell or cells in order to polarize the cells using carbon monoxide and hydrogen contained within the portion of the SOFC fuel exhaust stream provided to the pump 30. An oxidizer inlet stream, such as atmospheric air, is provided to the cathode of the molten carbonate fuel cell or cells. For example, atmospheric air contains a carbon dioxide concentration of 0.02% to 0.06%, such as about 0.035%. The air stream can contain higher concentrations of carbon dioxide, such as about 0.25%. An electric current is produced by transferring carbonate ions $(CO_3^{2-})$ from the cathode, through the molten carbonate electrolyte, to the anode according to the following reaction:

Cathode: $O_2 + 2CO_2 + 4e^- \rightarrow 2CO_3^{2-}$

Anode: $H_2 + CO_3^{2-} \rightarrow H_2O + CO_2 + 2e^-$ $CO + CO_3^{2-} \rightarrow 2CO_2 + 2e^-$ The power produced by the molten carbonate fuel cell is about 200 W and can be dissipated as heat or can be used to supply power to system components, such as a control system and/or system display components. The system 100 operating with a 100 kW SOFC stack 101 and integrated with a 200 kW molten carbonate fuel cell pump 30 can remove at least 6,500 pounds of carbon dioxide from the atmosphere each year. The additional fuel consumed by the system 101 for electrochemically removing the carbon dioxide from the air inlet stream and stack fuel exhaust stream is on the order of 0.3%, as compared to a system without such carbon dioxide removal capability. Thus, the pump 30 generates power and removes carbon dioxide from the air inlet stream provided to the SOFC stack 101.

The remaining fuel exhaust exiting outlet 46 of the carbon dioxide pump 30 is provided to the water gas shift reactor 128 via conduit 42. The air exhaust of the carbon dioxide pump 30 exits the air exhaust outlet 38 and is provided to the air inlet 40 of the SOFC stack 101. The air exhaust of the carbon dioxide pump 30 is depleted of carbon dioxide, for instance contains at least 90% less, such as 97% less carbon dioxide than the air inlet stream, and is preferably oxygen rich. Optionally, the air exhaust is provided to the air heat exchanger 127 which further heats the air inlet stream provided to the fuel cell stack 101.

At least 95% of hydrogen contained in the fuel exhaust stream provided to the unit 1 is separated in the unit 1, for example at least 99%, such as about 100%, of the hydrogen contained in the fuel exhaust stream is separated in the unit 1. All hydrogen remaining in the fuel exhaust stream except for the hydrogen that is converted to water in the pump 30 may be separated in unit 1. The hydrogen separated from the fuel exhaust stream in the unit 1 is then provided back into the fuel inlet stream. Preferably, the hydrogen is provided back into the fuel inlet conduit 111 upstream of the humidifier 119. The exhaust stream is provided to the dryer 20 which separates carbon dioxide from water. The separated carbon dioxide is provided through conduit 22 for sequestration in tank 21. For example, if the fuel cell stack 101 comprises a solid oxide regenerative fuel cell stack, then with the aid of a Sabatier reactor, the sequestered carbon dioxide can be used to generate a hydrocarbon fuel, such as methane, when the stack 101 operates in the electrolysis mode, as described in U.S. Pat. No. 7,045,238, incorporated herein by reference in its entirety. The separated water from dryer 20 is available for humidification of the fuel inlet stream or other industrial uses. For example, conduit 23 may provide the water from the dryer 20 back into the humidifier 119, into a steam generator (not shown) and/or directly into the fuel inlet conduit 111.

The SOFC stack fuel exhaust stream is provided into the unit 1 as follows. The fuel exhaust stream may contain hydrogen, water vapor, carbon monoxide, carbon dioxide, some unreacted hydrocarbon gas, such as methane and other reaction by-products and impurities. The portion of this exhaust stream is first provided into the heat exchanger 121, where its temperature is lowered, preferably to less than 200 degrees Celsius, while the temperature of the fuel inlet stream is raised. If the water-gas shift reactor 128 and the air preheater heat exchanger 125 are present, then both portions of the SOFC stack fuel exhaust stream from pump 30 and from heat exchanger 121 are provided through the reactor 128 to convert at least a portion of the water vapor and a majority of the residual carbon monoxide into carbon dioxide and hydrogen. The fuel exhaust stream is then passed through the heat exchanger 125 to further lower its temperature while raising the temperature of the air inlet stream. The temperature may be lowered to 120 to 180 degrees Celsius for example.

The fuel exhaust stream is then provided into inlet 2 of the unit 1 via conduit 3. During the separation step in unit 1, at least a majority of the hydrogen, such as at least 95% of the hydrogen in the fuel exhaust stream, diffuses through the electrolyte of the cells in the unit 1, while allowing the water vapor, carbon dioxide, and any remaining trace amounts of carbon monoxide and hydrocarbon gas in the fuel exhaust stream to be passed through conduit 9 to the humidifier 119. Preferably, the unit 1 separates at least 99% of the hydrogen in the fuel exhaust stream, such as about 100%.

In the fuel humidifier 119, a portion of the water vapor in the fuel exhaust stream is transferred to the fuel inlet stream to humidify the fuel inlet stream. The hydrocarbon and hydrogen fuel inlet stream mixture is humidified to 80 C to 90 C dew point. The remainder of the fuel exhaust stream is then provided into the dryer 20. The dryer 20 then separates the carbon dioxide from the water contained in the exhaust stream. The dry, substantially hydrogen free separated carbon dioxide is then provided to the containment unit 21 for sequestration, and the separated water is available for humidification of the fuel inlet stream or other industrial uses. Thus, the environmentally friendly system preferably contains no burner and the fuel exhaust is not combusted with air. The only exhaust from the system consists of three streams—water provided through conduit 23, sequestered carbon dioxide provided through conduit 22 to tank 21, and oxygen and carbon dioxide depleted air cathode exhaust stream through conduit 25. Thus, the system 100 generates electricity from a hydrocarbon fuel, while outputting substantially no pollutants into the atmosphere and cleaning the air by removing carbon dioxide from the air exhaust stream. Thus, the system outputs cleaner air than it takes in, without releasing pollutants into the atmosphere.

The hydrogen separated from the fuel exhaust stream is then removed from unit 1 through outlet 8 and conduit 7 and provided into the hydrocarbon fuel inlet stream in the fuel inlet conduit 111. If desired, prior to being provided to the fuel inlet conduit, the hydrogen stream may be passed through a hydrogen cooler heat exchanger 129, where the hydrogen stream exchanges heat with an air stream, such as the air inlet stream provided into the fuel cell stack 101. The temperature of the hydrogen stream is lowered in the heat exchanger 129 before being provided into the fuel inlet conduit, while the temperature of the air inlet stream is raised. Thus, the hydrocarbon fuel inlet stream is mixed with a low dew point, near ambient temperature recycled hydrogen recovered from the anode tail gas with an electrochemical hydrogen pump 1.

Thus, with respect to the fuel exhaust stream, the heat exchanger 121 is located upstream of the reactor 128, which is located upstream of the heat exchanger 125, which is located upstream of the pump unit 1, which is located upstream of the humidifier 119 and the fuel inlet conduit 111.

If desired, all or a portion of the hydrogen separated from unit 1 may be provided to a hydrogen using device, such as a PEM fuel cell in a vehicle or another hydrogen using device or to a hydrogen storage vessel. In this case, a selector valve may be placed in conduit 7 to either split the hydrogen stream between the fuel inlet conduit 111 and the hydrogen storage vessel or hydrogen using device, or to alternate the hydrogen flow between the fuel inlet conduit 111 and the hydrogen storage vessel or hydrogen using device. Any component of the system 100 may be operated by a computer or an operator to controllably vary the gas flow based on one or more of the following conditions: i) detected or observed conditions of the system 100 (i.e., changes in the system operating conditions requiring a change in the amount of hydrogen in the fuel inlet stream); ii) previous calculations provided into the computer or conditions known to the operator which require a temporal adjustment of the hydrogen in the fuel inlet stream; iii) desired future changes, presently occurring changes or recent past changes in the operating parameters of the stack 101, such as changes in the electricity demand by the users of electricity generated by the stack, changes in price for electricity or hydrocarbon fuel compared to the price of hydrogen, etc., and/or iv) changes in the demand for hydrogen by the hydrogen user, such as the hydrogen using device, changes in price of hydrogen or hydrocarbon fuel compared to the price of electricity, etc.

It is believed that by recycling at least a portion of the hydrogen from the fuel exhaust (i.e., tail) gas stream into the fuel inlet stream, a high efficiency operation of the fuel cell system is obtained. Furthermore, the overall fuel utilization is increased. For example, at least 95% of the hydrogen in the fuel exhaust is separated by the unit 1 and recycled back to the stack 101. Preferably at least 99%, such as about 100%, of the fuel exhaust gas hydrogen is separated by the unit 1 and recycled back to the stack 101. The "overall" or "effective" fuel utilization of a system having a given "per pass" fuel utilization rate is typically greater than the percentage of hydrogen recycled by such a system. For example, a system that recycles only 85% of the fuel exhaust gas hydrogen has an effective fuel utilization of about 94% to about 95%, if its per pass utilization is about 75%. Such a system would have an AC electrical efficiency of about 50% to about 60%, such as about 54% to 60%. In contrast, the instant system 100 includes a cascaded electrochemical hydrogen pump unit 1, which recycles at least 95% of exhaust hydrogen, and therefore operates at a higher overall fuel efficiency (greater than 95%) and a higher AC electrical efficiency greater than 60%. Even higher efficiency may be obtained by increasing the per pass fuel utilization rate above 75%, such as about 76-80%. At steady-state, there is no need for generating steam when steam methane reformation is used to create the feed gas to the fuel cell. The fuel exhaust stream contains enough water vapor to humidify the fuel inlet stream to the stack at steam to carbon ratios of 2 to 2.5. The increase in overall fuel utilization and the removal of heat requirement to generate steam increases the overall electrical efficiency. In contrast, a system that does not recycle any of the exhaust hydrogen has an AC electrical efficiency of only about 45%, assuming equivalent per pass utilization.

The fuel cell system described herein may have other embodiments and configurations, as desired. Other components may be added if desired, as described, for example, in U.S. application Ser. No. 10/300,021, filed on Nov. 20, 2002 and published as U.S. Published Application No. 2003/0157386, in U.S. Provisional Application Ser. No. 60/461,190, filed on Apr. 9, 2003, and in U.S. application Ser. No. 10/446,704, filed on May 29, 2003 and published as U.S. Published Application No. 2004/0202914, all of which are incorporated herein by reference in their entirety. Furthermore, it should be understood that any system element or method step described in any embodiment and/or illustrated in any FIGURE herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system, comprising:
providing a hydrocarbon fuel inlet stream and a carbon dioxide containing air inlet stream into the fuel cell system, wherein the fuel cell system comprises a fuel cell stack and a carbon dioxide pump;
operating the system to generate electricity and a plurality of output streams consisting essentially of oxygen and carbon dioxide depleted air, water, and carbon dioxide available for sequestration,
providing the carbon dioxide containing air inlet stream into the carbon dioxide pump;
removing at least 90 percent of the carbon dioxide contained in the air inlet stream using the carbon dioxide pump;
providing the air inlet stream from which the at least 90 percent carbon dioxide has been removed from the carbon dioxide pump into the fuel cell stack;
operating the fuel cell stack to generate the electricity, a fuel exhaust stream and an oxygen and carbon dioxide depleted air exhaust stream;
providing at least a portion of the fuel exhaust stream into the carbon dioxide pump; and
removing at least a portion of the carbon dioxide contained in the air inlet stream using the fuel exhaust stream in the carbon dioxide pump.

2. The method of claim 1, further comprising:
providing the hydrocarbon fuel inlet stream toward the fuel cell stack.

3. The method of claim 2, wherein:
the fuel cell stack comprises a SOFC stack; and
the carbon dioxide pump comprises a molten carbonate fuel cell stack.

4. The method of claim 3, further comprising separating at least 95% of hydrogen contained in the fuel exhaust stream using a cascaded electrochemical hydrogen pump, and providing the hydrogen separated from the fuel exhaust stream into the hydrocarbon fuel inlet stream.

5. The method of claim 4, further comprising providing a remaining fuel exhaust stream consisting essentially of water and carbon dioxide from the cascaded electrochemical hydrogen pump to a dryer, separating the water from the carbon dioxide in the dryer and sequestering the separated carbon dioxide.

6. The method of claim 5, wherein all output streams of the system consist essentially of a first output stream consisting essentially of oxygen and carbon dioxide depleted air, a second output stream consisting essentially of water, and a third output stream consisting essentially of carbon dioxide provided for sequestration.

7. The method of claim 3, wherein the air inlet stream comprises at least 0.02% carbon dioxide by volume.

8. A fuel cell system, comprising:
a solid oxide fuel cell stack;
a carbon dioxide pump;
a first conduit which operatively connects a fuel exhaust outlet of the fuel cell stack to a first inlet of the carbon dioxide pump; and
a second conduit which operatively connects an air exhaust outlet of the carbon dioxide pump to an air inlet of the fuel cell stack.

9. The system of claim 8, wherein:
the carbon dioxide pump further comprises a second inlet exposed to an air atmosphere comprising carbon dioxide; and
the carbon dioxide pump is adapted to remove at least a portion of the carbon dioxide in the atmosphere.

10. The system of claim 9, wherein the carbon dioxide pump is adapted to remove at least 90% of the carbon dioxide in the atmosphere comprising at least 0.02% carbon dioxide by volume.

11. The system of claim 8, further comprising a third conduit which operatively connects a fuel exhaust outlet of the carbon dioxide pump to an inlet of a cascaded electrochemical hydrogen pump, a fourth conduit which operatively connects a first outlet of the cascaded electrochemical hydrogen pump to a fuel inlet of the fuel cell stack and a fifth conduit which operatively connects a second outlet of the cascaded electrochemical hydrogen pump to a dryer.

12. The system of claim 11, further comprising a carbon dioxide storage tank operatively connected to one output of the dryer.

13. The system of claim 11, wherein the cascaded electrochemical hydrogen pump comprises a high temperature, low hydration ion exchange membrane cell stack.

14. The system of claim 8, wherein:
the carbon dioxide pump comprises a molten carbonate fuel cell stack.

15. A method of operating a fuel cell system, comprising:
providing a hydrocarbon fuel inlet stream towards a solid oxide fuel cell stack;
providing an air inlet stream and at least a portion of a fuel exhaust stream of the solid oxide fuel cell stack to a molten carbonate carbon dioxide pump to remove carbon dioxide from the air inlet stream; and
providing a carbon dioxide depleted air stream from the carbon dioxide pump into the solid oxide fuel cell stack.

* * * * *